United States Patent
Mizutome et al.

(10) Patent No.: US 7,810,130 B2
(45) Date of Patent: Oct. 5, 2010

(54) METHOD AND APPARATUS OF POWER MANAGEMENT FOR MOVING IMAGE-STREAMING CONTENT

(75) Inventors: Atsushi Mizutome, Kanagawa (JP); Masaki Kutsuna, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1382 days.

(21) Appl. No.: 10/671,741

(22) Filed: Sep. 29, 2003

(65) Prior Publication Data

US 2004/0078472 A1   Apr. 22, 2004

(30) Foreign Application Priority Data

Oct. 8, 2002   (JP)   ............... 2002-295062

(51) Int. Cl. *H04N 7/173* (2006.01)
(52) U.S. Cl. ............. 725/134; 709/227; 348/731
(58) Field of Classification Search ............. 348/731, 348/725; 725/139, 146, 148, 32, 34, 134; 709/227, 229; 455/343, 574
See application file for complete search history.

(56) References Cited

U.S. PATENT DOCUMENTS

| | | | |
|---|---|---|---|
| 6,008,802 A * | 12/1999 | Iki et al. .................. 715/721 |
| 6,337,719 B1 * | 1/2002 | Cuccia .................... 348/731 |
| 6,931,657 B1 * | 8/2005 | Marsh ..................... 725/46 |
| 2001/0010097 A1 * | 7/2001 | Lee ......................... 725/132 |
| 2001/0035917 A1 * | 11/2001 | Satake et al. .............. 348/730 |
| 2002/0002542 A1 | 1/2002 | Ando et al. ................ 705/57 |
| 2002/0010923 A1 * | 1/2002 | Pack et al. ................ 725/32 |
| 2002/0065910 A1 * | 5/2002 | Dutta ....................... 709/224 |
| 2002/0138829 A1 | 9/2002 | Matsumoto et al. ........ 725/14 |
| 2002/0157094 A1 | 10/2002 | Saito et al. ................ 725/38 |
| 2002/0162121 A1 * | 10/2002 | Mitchell .................. 725/135 |

FOREIGN PATENT DOCUMENTS

| | | |
|---|---|---|
| JP | 08-032955 | 2/1996 |
| JP | 2001-054090 | 2/2001 |
| JP | 2001-298719 | 10/2001 |
| JP | 2001-359073 | 12/2001 |

* cited by examiner

*Primary Examiner*—Scott Beliveau
*Assistant Examiner*—Alan Luong
(74) *Attorney, Agent, or Firm*—Fitzpatrick, Cella, Harper & Scinto

(57) ABSTRACT

Provided is a receiving apparatus for receiving streaming contents which is capable of receiving contents at a higher speed. The receiving apparatus receives and accumulates the streaming contents periodically during a power off state or while other contents are being audiovisually enjoyed.

8 Claims, 12 Drawing Sheets

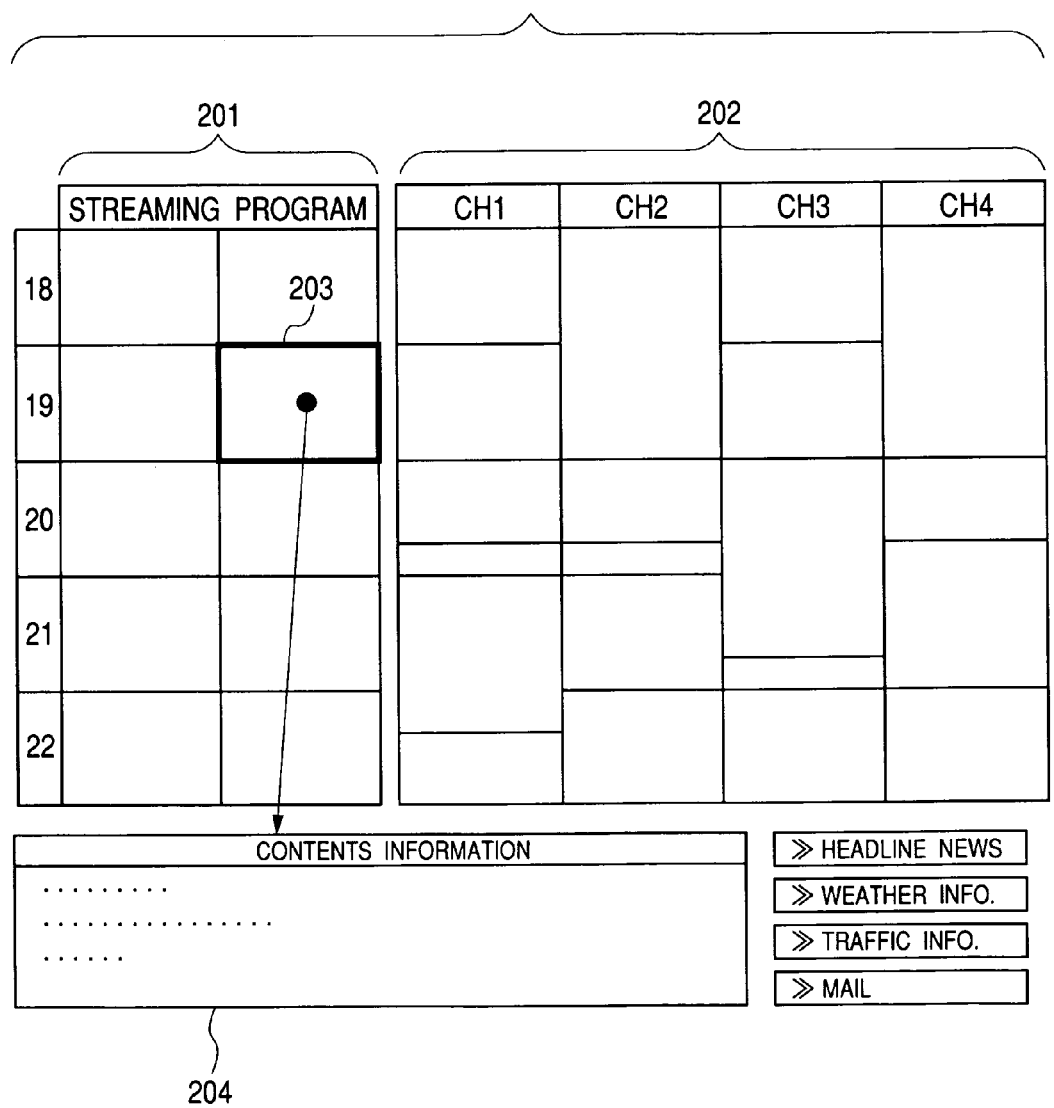

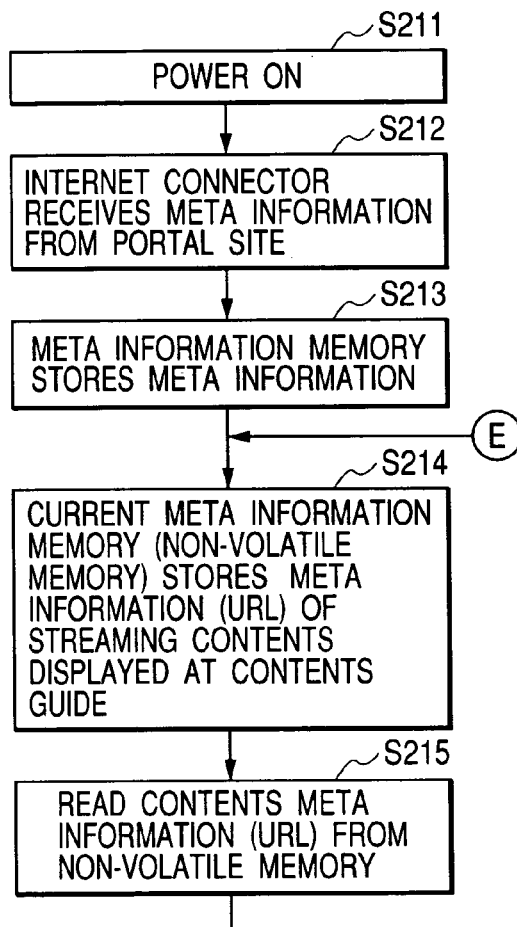
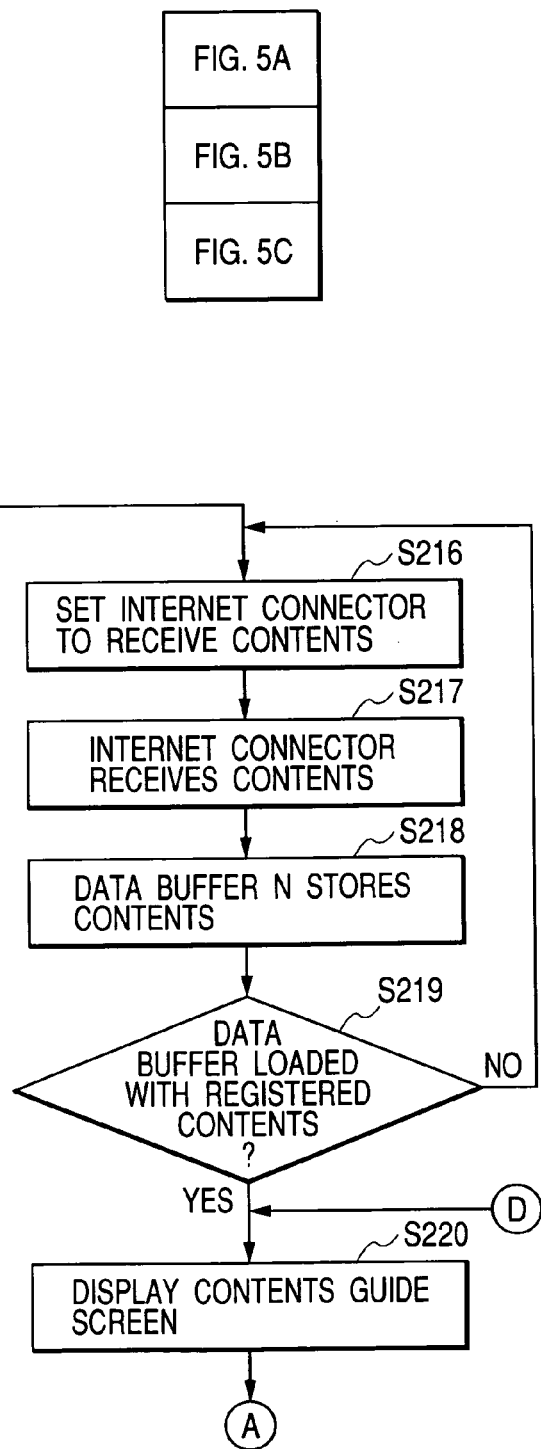
FIG. 5A
FIG. 5

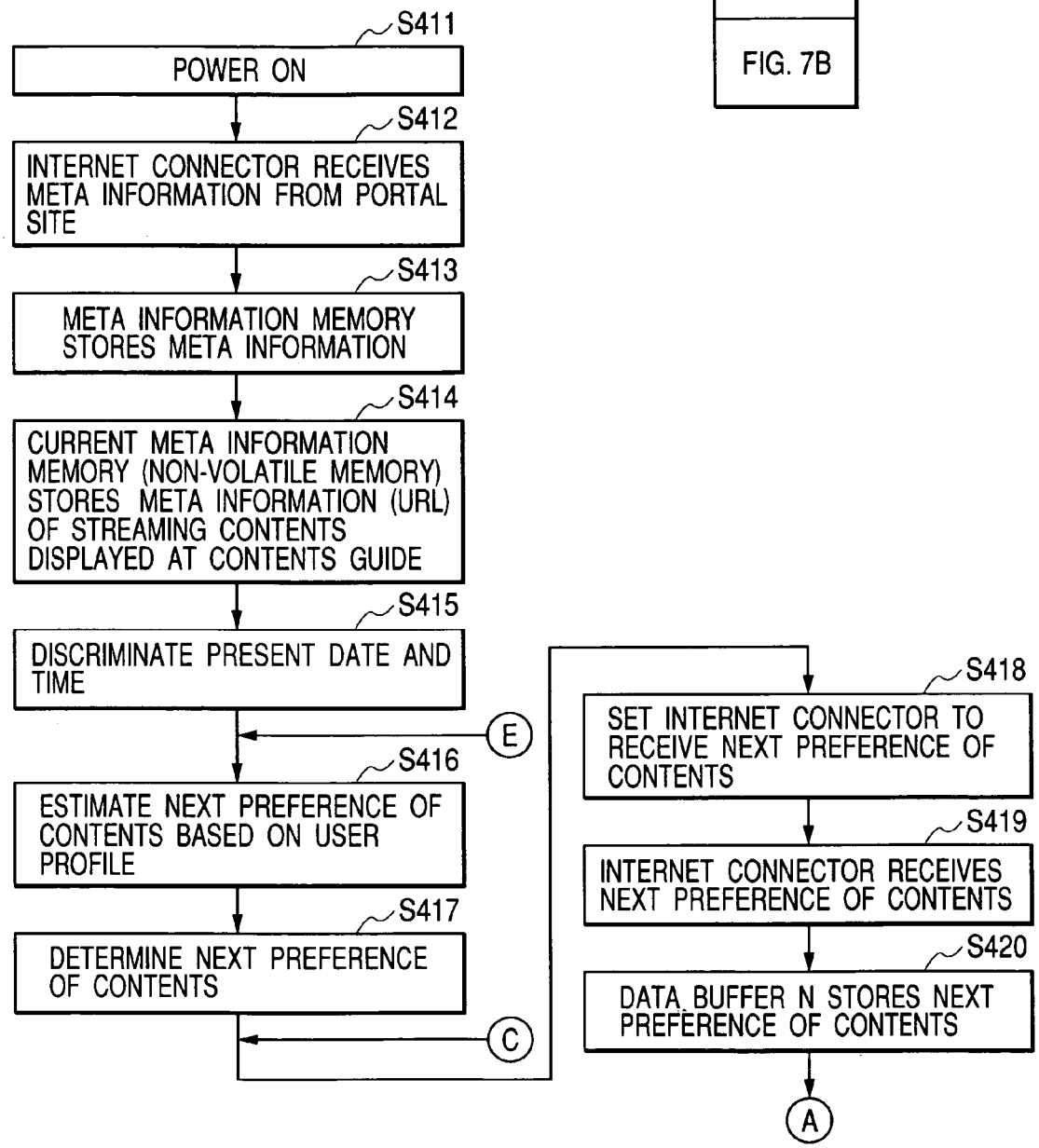

FIG. 8

| out_URL | CRID | Cat | Date | Day | Time | Date_Stamp | Rec | Freq |
|---|---|---|---|---|---|---|---|---|
| http://ServerA/.../filename1.xxx | AAA/Sport | 2 | -1 | 6 | 19 | 20010428 | 0 | 10 |
| http://ServerB/.../filename19.yyy | BBB/Sport | 2 | -1 | 1 | 20 | 20010422 | 1 | 5 |
| http://ServerE/.../filename5 | EEE/Variety | 4 | -1 | 3 | 22 | 20010425 | 0 | 2 |
| http://ServerA/.../filename9 | AAA/Quiz | 12 | -1 | 3 | 23 | 20010502 | 0 | 8 |
| http://ServerG/.../filename24 | GGG/News | 1 | -1 | -1 | 07 | 20010428 | 0 | 20 |
| http://ServerK/.../filename28 | KKK/TalkShow | 20 | -1 | 4 | 13 | 20010503 | 0 | 2 |
| http://ServerA/.../filename5 | AAA/Drama | 16 | -1 | 6 | 22 | 20010505 | 0 | 4 |
| http://ServerC/.../filename3 | CCC/Drama | 16 | -1 | 7 | 09 | 20010429 | 1 | 2 |
| ... | | | | | | | | | cnt_URL     URL OF AUDIO VISUALLY ENJOYED CONTENTS
CRID        ID OF AUDIO VISUALLY ENJOYED CONTENTS
Cat ID      CATEGORIES OF CONTENTS ENJOYED (NEWS: 1, SPORTS: 2, DRAMA: 16, ...)
Date        DATES [1–31]
Day         A DAY OF WEEK [1–7 1: MON, 2: TUE, ......, 7: SUN]
Time        TIME [0–23]
Date_Stamp  RENEWAL DATE [yyyy/mm/dd]
Rec         RECORD [0: PLAY, 1: RECORD]
Freq        FREQUENCY [xx TIMES]

REFERENCE:  rtsp://realserver/media/video1.rm (IN CASE OF RealServer)
            mms://nsserver/content/video1.asf (IN CASE OF Windows Media Server)

xxx/yyy: EXTENSION OF STREAMING CONTENTS
e.g. .asf: Windows Media FILE, rm: Real Video FILE etc.

METHOD AND APPARATUS OF POWER MANAGEMENT FOR MOVING IMAGE-STREAMING CONTENT

BACKGROUND OF THE INVENTION

1. Field of the Invention

The present invention relates to a receiving apparatus, and particularly to an apparatus for receiving a streaming broadcast.

2. Related Background Art

In recent years, information is distributed to individual households through various media. For example, television broadcasts, radio broadcasts, data broadcasts, etc. are distributed by means of ground waves as broadcast waves, satellites, etc. In addition, distribution services for images, audio, information, etc. are provided by means of the Internet, electronic mails, etc. through communication lines.

A conventional broadcast system is currently being shifted to a digital broadcast system in which television signals are transmitted as digital signals. The shift to the digital broadcast system is underway to enhance image quality and to increase the number of channels by utilizing digital transmission and coding technologies.

On the other hand, a communication system is benefiting from recent progresses of the digital coding technologies related to image and audio data, and from improved network environments (including broadband). As a result, it is becoming widespread to use the Internet to provide a distribution of moving images comparable in quality to that of the television broadcast, that is, a distribution of streaming contents (hereinafter, referred to as "streaming broadcast").

The streaming broadcast includes the term "broadcast", but is largely different in arrangement from the conventional television broadcast (of a push type) in the first place. In other words, while the distribution of the images and audio is similarly performed by means of the communication lines such as the Internet through, the streaming broadcast requires a user to access and obtain desired streaming contents (which is called a pull type). Unlike general television broadcast receiving, the streaming broadcast is not received immediately after calling up a desired channel.

Currently, the streaming broadcast is received (utilized) using a personal computer (hereinafter, referred to as "PC") in most cases, and generally requires the following procedure.

A user who wishes to audiovisually enjoy the streaming broadcast must first find out desired contents (a desired streaming broadcast program) from among many streaming contents scattered throughout the Internet. For that purpose, the user activates an Internet browser, and then visits a portal site related to the streaming broadcast or searches through Websites by using a search engine or the like. Thus, the user finds out information on the desired streaming contents.

By the above operations, the user obtains information related to the desired streaming contents including program information such as a title, distribution information such as a start time, and address information such as a Uniform Resource Locator (hereinafter, referred to as "URL"). After that, the user accesses an address (URL) where the streaming contents exist to start to obtain the streaming contents. Concurrently, application software called a streaming player is activated, so that the streaming contents are audiovisually enjoyed (reproduced).

In the case of receiving the streaming contents, it is necessary to subject several to ten and several seconds of data to a buffering process before starting reproduction. The buffering process is performed as a requirement for decoding receive data on a terminal side, but mostly for mainly compensating uncertainty of speed on the Internet as a channel to perform smooth reproduction on the terminal side.

The above-mentioned type of receiving process for streaming contents is disclosed, for example, in JP 2001-359073 A.

As described above, the streaming broadcast is currently utilized by PC users in most cases. However, the present inventors presupposes that in the near future, while communication infrastructures are improved in the individual households, it becomes widespread to enjoy the streaming broadcast, as well as the conventional television broadcast, on television in living rooms.

In the above case, it is conceivable that it is demanded for a user to select and audiovisually enjoy a program (contents) of the streaming broadcast in such a manner as to feel as comfortable as in the conventional television broadcast.

The above-mentioned operation for audiovisually enjoying the streaming broadcast using a PC is the same as a conventional pull-type operation for obtaining information based on a demand (an instruction) of a user, such as an operation for browsing Websites or using electric mails. Therefore, a general PC user may feel no discomfort except that it is inconvenient to search for and audiovisually enjoy the streaming contents.

However, a general television audience is accustomed to watching television, that is, being able to audiovisually enjoy a desired program immediately after turning on a power and selecting a corresponding channel. Therefore, it is impractical for the television audience himself/herself to find out main data and a location (address (and a file name)) of streaming contents that he/she wishes to audiovisually enjoy, and to perform the pull-type operation for receiving distributed contents based on the found data. Thus, it is necessary to provide a form capable of selecting and audiovisually enjoying contents by a simpler method such that the audience feels as comfortable as when audiovisually enjoying a television program.

There is another problem described above in that unlike the general process for receiving the television broadcast, the receiving process for the streaming contents requires a time period of several to ten and several seconds at the time of switching the streaming contents which corresponds to the time of changing channels on television. Meanwhile, the user must wait for the same time period.

The above problem is caused by the time period for buffering described above, which equals to a total length of a time period required for buffering desired streaming contents in a distribution side server and a time period required for buffering a predetermined amount of the streaming contents on a receiving terminal side. Generally, the higher a data rate for contents is, the longer the buffering time period for the contents becomes.

Accordingly, it is impossible that the user selects the desired streaming contents in such a manner as to feel as comfortable as when switching channels on television.

SUMMARY OF THE INVENTION

The present invention therefore has an object to provide a receiving apparatus and a receiving method which are capable of receiving contents at a higher speed when receiving a streaming broadcast through a network.

Another object of the present invention is to provide a receiving apparatus and receiving method for receiving streaming contents through a network, the receiving apparatus and receiving method including:

in response to an instruction of a power off, periodically receiving during the power off the streaming contents that are received immediately before the power off; and accumulating in accumulating means data of the streaming contents that are periodically received during the power off.

Further another object of the present invention is to provide a receiving apparatus and receiving method for receiving streaming contents through a network and outputting the streaming contents to a monitor device, the receiving apparatus and receiving method including:

in response to an instruction of a monitor stop for the streaming contents, periodically receiving during the monitor stop the streaming contents that are received immediately before the monitor stop; and accumulating in accumulating means data of the streaming contents that are periodically received during the monitor stop.

Still another object of the present invention is to provide a receiving apparatus and receiving method for receiving streaming contents through a network, the receiving apparatus and receiving method including:

based on predetermined guide information related to plural sets of the streaming contents, periodically receiving the plural sets of the streaming contents in parallel; and accumulating in accumulating means data of the plural sets of the streaming contents that are periodically received.

Yet still another object of the present invention is to provide a receiving apparatus and receiving method for receiving arbitrarily selected streaming contents through a network by receiving means, and outputting the received streaming contents to a monitor device in an audiovisually enjoyable form, the receiving apparatus and receiving method including:

estimating and determining a streaming contents preference to be selected from plural sets of the streaming contents based on a user profile;

periodically receiving the streaming contents preference determined, during a power off; and accumulating in accumulating means data of the streaming contents preference that is periodically received.

Further, yet still another object of the present invention is to provide a receiving apparatus and receiving method for receiving arbitrarily selected streaming contents through a network by receiving means, and selectively outputting the received streaming contents and other contents to a monitor device in an audiovisually enjoyable form, the receiving apparatus and receiving method including:

estimating and determining a streaming contents preference to be selected from plural sets of the streaming contents based on a user profile;

periodically receiving the streaming contents preference determined during a period when the other contents are outputted to the monitor device; and accumulating in accumulating means data of the streaming contents preference that is periodically received.

Further, yet still another object of the present invention is to provide a receiving apparatus and receiving method for receiving arbitrarily selected streaming contents through a network by receiving means, and outputting the received streaming contents to a monitor device in an audiovisually enjoyable form, the receiving apparatus and receiving method including:

estimating and determining a streaming contents preference to be selected from plural sets of the streaming contents based on a user profile;

in response to a power on, periodically receiving the streaming contents preference determined; and accumulating in accumulating means data of the streaming contents preference that is periodically received.

BRIEF DESCRIPTION OF THE DRAWINGS

FIG. 2 is a diagram showing an appearance of a contents guide screen;

FIG. 8 is a diagram showing user profile data.

DESCRIPTION OF THE PREFERRED EMBODIMENTS

Figure 1A:
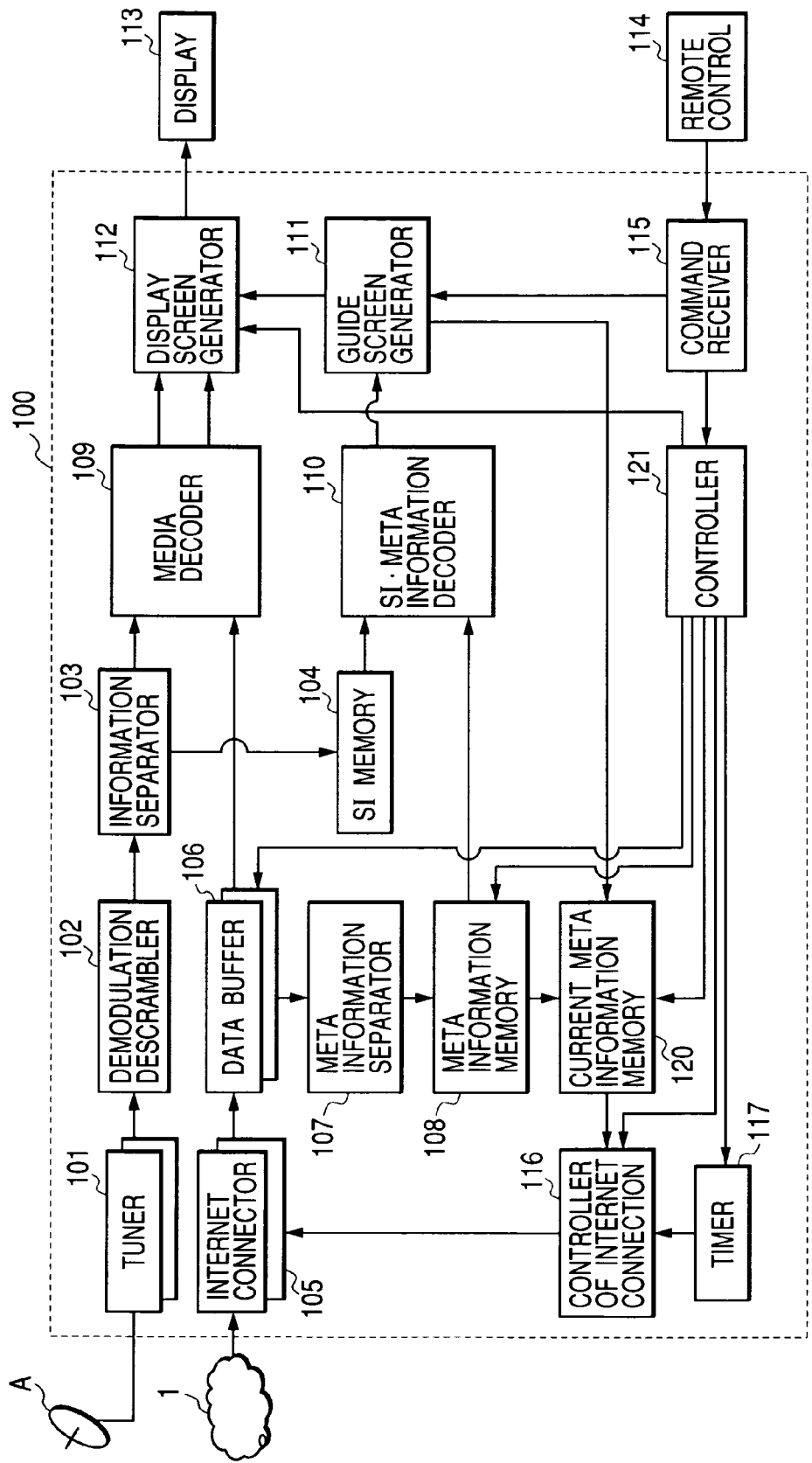
FIG. 1A is a block diagram showing a configuration of a receiving apparatus to which the present invention is applied.

According to an embodiment mode of the present invention, a receiving apparatus includes:

receiving means for receiving streaming contents through a network;

power detecting means for detecting an instruction of a power off from operation instructing means;

controlling means for, in response to an output from the power detecting means indicating detection of the power off, controlling the receiving means to periodically receive during the power off the streaming contents that are received by the receiving means immediately before the power off; and accumulating means for accumulating data of the streaming contents that are periodically received during the power off.

According to another embodiment mode of the present invention, a receiving apparatus includes:

receiving means for receiving streaming contents through a network;

outputting means for outputting the streaming contents to a monitor device;

detecting means for detecting an instruction of a monitor stop for the streaming contents;

controlling means for, in response to an output from the detecting means indicating detection of a monitor stop, controlling the receiving means to periodically receive during the monitor stop the streaming contents that are received by the receiving means immediately before the monitor stop; and accumulating means for accumulating data of the streaming contents that are periodically received during the monitor stop.

According to further another embodiment mode of the present invention, a receiving apparatus includes:

receiving means for receiving streaming contents through a network;

controlling means for, based on predetermined guide information related to plural sets of the streaming contents, controlling the receiving means to periodically receive the plural sets of the streaming contents in parallel; and accumulating means for accumulating data of the plural sets of the streaming contents that are periodically received.

According to still another embodiment mode of the present invention, a receiving apparatus, which receives arbitrarily selected streaming contents through a network by receiving means, and outputs the received streaming contents to a monitor device in an audiovisually enjoyable form, includes:

estimating means for estimating and determining a streaming contents preference to be selected from plural sets of the streaming contents based on a user profile;

controlling means for controlling the receiving means to periodically receive the streaming contents preference determined by the estimating means, during a power off; and accumulating means for accumulating data of the streaming contents preference that is periodically received.

According to yet still another embodiment mode of the present invention, a receiving apparatus, which receives arbitrarily selected streaming contents through a network by receiving means, and selectively outputs the received streaming contents and other contents to a monitor device in an audiovisually enjoyable form, includes:

estimating means for estimating and determining a streaming contents preference to be selected from plural sets of the streaming contents based on a user profile;

controlling means for controlling the receiving means to periodically receive the streaming contents preference determined by the estimating means during a period when the other contents are outputted to the monitor device; and accumulating means for accumulating data of the streaming contents preference that is periodically received.

Further, according to yet still another embodiment mode of the present invention, a receiving apparatus, which receives arbitrarily selected streaming contents through a network by receiving means, and outputs the received streaming contents to a monitor device in an audiovisually enjoyable form, includes:

estimating means for estimating and determining a streaming contents preference to be selected from plural sets of the streaming contents based on a user profile;

controlling means for, in response to a power on, controlling the receiving means to periodically receive the streaming contents preference determined by the estimating means; and accumulating means for accumulating data of the streaming contents preference that is periodically received.

Embodiment 1

FIG. 1A is a block diagram showing a configuration of a receiving apparatus 100 according to this embodiment.

The receiving apparatus 100 shown in FIG. 1A is capable of receiving a television broadcast by broadcast waves and also a streaming broadcast distributed through the Internet. In addition to receiving a digital broadcast, the receiving apparatus 100 receives various images, video, and data through the Internet, and outputs to a display 113 a program, streaming contents, and Internet information (a Website, an electronic mail, etc.) which are selected by a user using a remote control 114.

The receiving apparatus 100 includes a tuner 101, a demodulation descrambler 102, an information separator 103, a service information (hereinafter, referred to as "SI") memory 104, an Internet connector 105, a data buffer 106, a metainformation separator 107, a metainformation memory 108, a media decoder 109, an SI/metainformation decoder 110, a guide screen generator 111, a display screen generator 112, the display 113, the remote control 114, a command receiver 115, a controller of Internet connection 116, a timer 117, a current metainformation memory 120, and a controller 121.

Figure 1B:
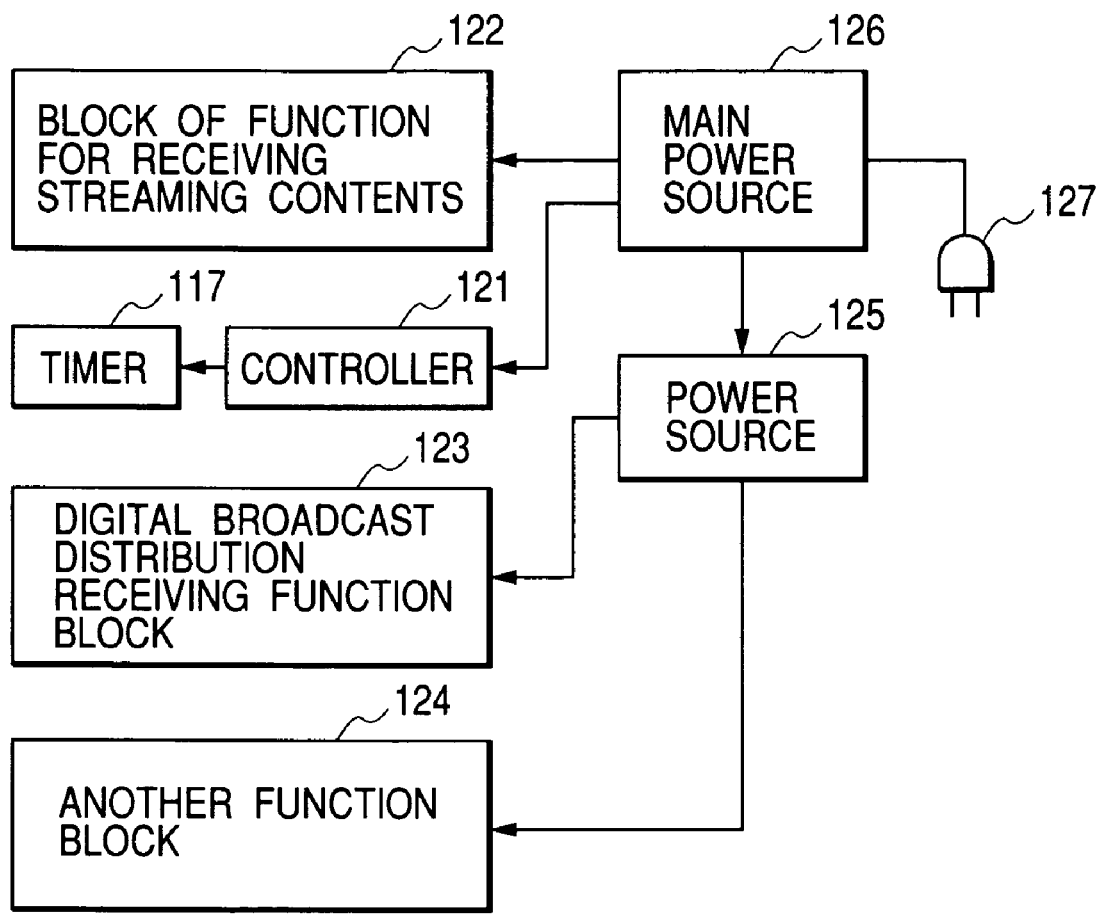
FIG. 1B is a block diagram showing a power supply system used for the present invention.

In FIGS. 1A and 1B, the tuner 101, the demodulation descrambler 102, and the information separator 103 compose a digital broadcast distribution receiving function block 123 that is used when receiving a digital broadcast. The Internet connector 105, the data buffer 106, the metainformation separator 107, the metainformation memory 108, the controller of Internet connection 116, the current metainformation memory 120, and the like compose a streaming contents receiving function block 122 that is involved when receiving a streaming broadcast. The media decoder 109 and the SI/metainformation decoder 110 compose a function block (a kind of another function block 124) that is used for both a digital broadcast system and a streaming broadcast system. The guide screen generator 111, the display screen generator 112, and the like also compose a kind of another function block 124 for both systems. Here, the controller 121 controls an operation of a main power source 126 that is connected to a commercial power source (or battery) 127 and an operation of a power source 125.

The tuner 101 and the demodulation descrambler 102 receive a radio wave having a designated frequency from digital broadcast waves transmitted through an antenna A or a cable (not shown), perform processes such as demodulation, A/D conversion, error correction, and descrambling for limited reception if necessary, and generate a data row called a transport stream (TS).

The information separator 103 separates the generated transport stream into two groups: video information, audio information, and data broadcast information; and related information (such as PSI/SI) accompanying the above information, and sends the former group to the media decoder 109 and the latter group to the SI memory 104.

From among the information sent as the PSI/SI, the SI memory 104 stores information related to a transmission line of each channel (such as a modulation frequency) and information related to a broadcast program (such as a program title and a broadcast date and time) by associating one with another.

The media decoder 109 decodes the video information, audio information, and data broadcast information sent from the information separator 103, and sends the respective information as display data to the display screen generator 112. The media decoder 109 has a function for decoding streaming contents received through the Internet described later in addition to decoding audiovisual data in an MPEG-2 format widely adopted in the digital broadcast.

The SI/metainformation decoder 110 decodes SI information in the digital broadcast system inputted from the SI memory 104, and metainformation (additional information and attribute information) of the streaming contents inputted from the metainformation memory 108, according to their corresponding coding systems, and sends the respective information to the guide screen generator 111.

The guide screen generator 111 generates a guide screen for selecting a television program and streaming contents based on the related information of television programs and streaming contents which are decoded in the SI/metainformation decoder 110. According to this embodiment, in order to seamlessly provide a user with television broadcast programs and streaming contents received through the Internet, a streaming contents guide function and an electronic program guide (hereinafter, referred to as "EPG") function are integrated to display an "integrated contents guide" that enables the user to check the streaming contents and the television programs at a glance on one screen. FIG. 2 shows an example of displaying the integrated contents guide.

In FIG. 2, a vertical axis indicates broadcast time slots. A horizontal axis of FIG. 2 contains a display area 201 for streaming contents programs and a display area 202 for television broadcast programs. In the display area 201, two streaming contents programs are displayed for each time slot. In the display area 202, broadcast channels are displayed along a direction of the horizontal axis.

A cursor 203 for selection can be arbitrarily moved by operating an up/down/left/right key of the remote control 114. An area 204 displays detailed information related to a program designated by the cursor 203.

The generated guide screen is sent to the display screen generator 112, and displayed on the display 113 by being synthesized with or replacing main data to be displayed such as video, audio, and data sent from the media decoder 109.

On the other hand, the Internet connector 105 as hardware represents a connector (such as modem or router) for connecting to a communication line such as a telephone line, CATV, ADSL, or FTTH. The Internet connector 105 as software represents middleware (a protocol stack) that supports: a relatively low-order Internet protocol corresponding to the transport layer and the network layer, such as TCP, UDP, or IP; and a protocol corresponding to the application layer which differs depending on the kinds of streaming contents. The Internet connector 105 is utilized to access an external Web server through the Internet I, and receive various audiovisual data including streaming contents and various information from the Web server. Note that the Internet connector 105 is capable of simultaneously accessing (establishing sessions for) a plurality of Web servers or plural sets of contents in the servers.

The data buffer 106 is a buffer memory for accumulating data of streaming contents, and stores streaming data of current and next preferences of contents and metainformation as related information thereof. An operation of the data buffer 106 will be described later.

The metainformation separator 107 extracts and separates the metainformation of streaming contents. Here, the metainformation represents information related to streaming contents (profile of contents), and includes a file called a metafile sent from the streaming server side before actual contents distribution and information described in a header section of main data of contents. Also, profile information of contents may recently be included in a file described in a Synchronized Multimedia Integration Language (hereinafter, referred to as "SMIL").

In many cases, the metafile includes, as the profile information of contents, a description of a destination link related thereto in addition to an entity of metainformation. Therefore, by referring to the metafile and following the destination link described therein, the profile information of the contents can be obtained as a series of metainformation.

The metainformation includes information on contents such as a location address, a title, a genre, an abstract, a reproduction time period, whether recording is permitted or not, and a producer name. In addition, a logo and the like of the contents can be obtained by following the destination link.

The metainformation separator 107 extracts the metainformation including the address of the currently displayed contents, and the metainformation memory 108 stores the metainformation. Even if the kinds of streaming contents are different, contents (description contents) of their metainformation are similar to each other, but differ in description format. Thus, the metainformation separator 107 of this embodiment is adapted to interpret metafiles of such plural kinds of streaming contents.

The streaming contents data accumulated in the data buffer 106 is sent to the media decoder 109, and decoded according to description languages and coding systems used for the respective data. As described above, in this embodiment, the media decoder 109 has the decoding function for both the digital broadcast system and the streaming broadcast system.

The remote control 114 serves as an important user interface. In the case of receiving streaming contents, a user directly operates the remote control 114 based on the integrated guide screen displayed on the display 113 to select desired contents. In addition to a function for switching channels as a remote control for television, the remote control 114 is added with a function for inputting and selecting a URL (text).

The command receiver 115 receives a command from the remote control 114, and sends the command to the controller 121. Based on the content of the command, the controller 121 performs switching to contents selected by a user, turning up/down a volume, turning on/off a power, or the like.

The current metainformation memory 120 is a non-volatile memory, and stores the metainformation of streaming contents that are being audiovisually enjoyed by a user. Every time the user performs switching the audiovisually enjoyed contents or the like operation, the current metainformation memory 120 constantly stores the metainformation of the latest audiovisually enjoyed contents. Note that the metainformation stored in the current metainformation memory 120 includes at least address information.

The timer 117 includes a general function of a calendar and a clock. In addition, the timer 117 includes a timer that starts a timer operation by an instruction of the controller 121 and outputs a timing signal for instructing periodical connection to the controller of Internet connection 116 during a power off state.

At the timing instructed by the timer 117, based on the information stored in the current metainformation memory 120, the controller of Internet connection 116 performs connection setting on the Internet connector 105 so as to access the URL of streaming contents that are audiovisually enjoyed by a user in the last time.

Next, description will be made of an operation according to this embodiment.

Figure 4:
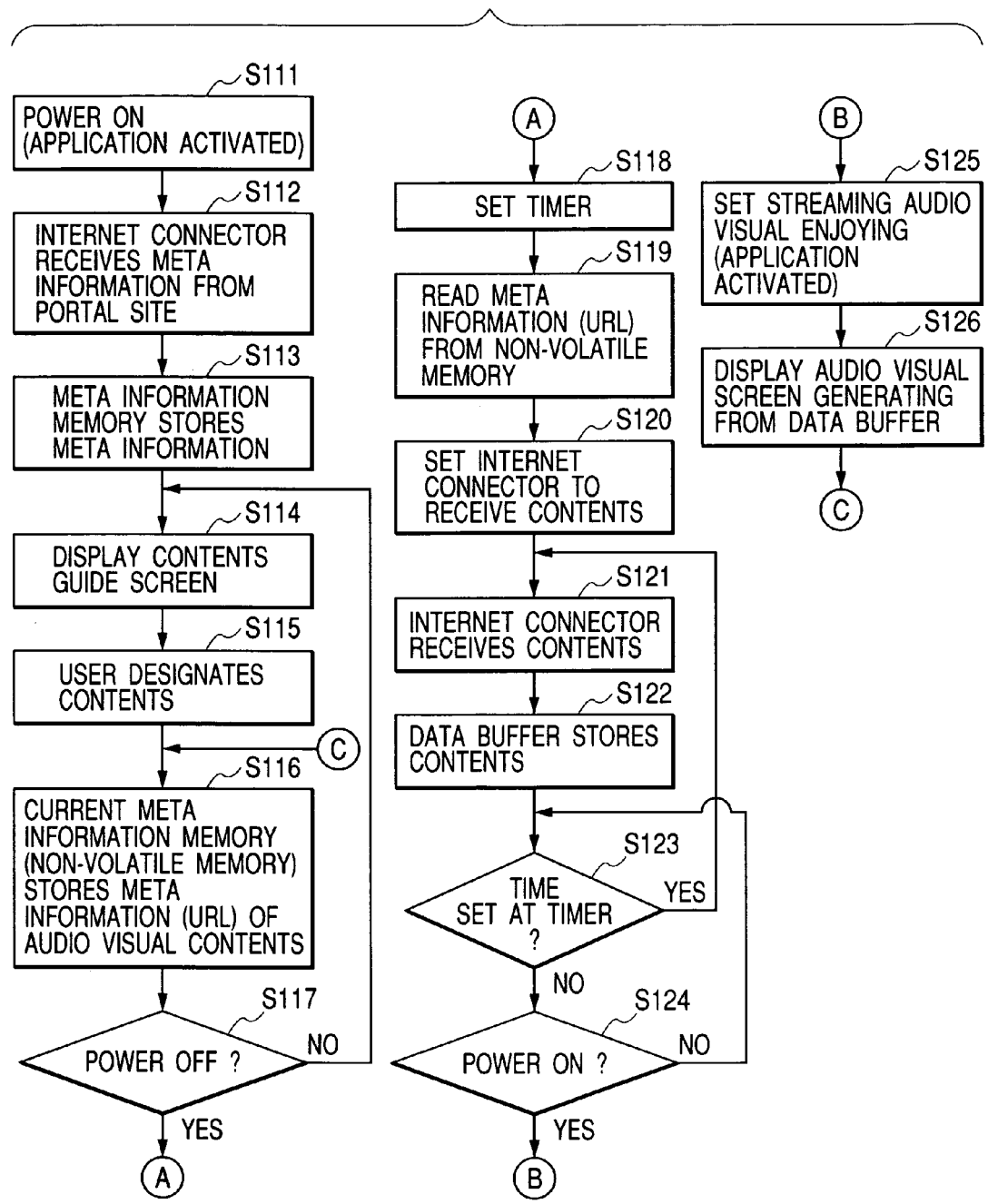
FIG. 4 is a flow chart showing a receiving operation.

FIG. 4 is a flow chart showing a process of the controller 121 accompanied by turning on/off of the power.

If a user operates a power switch of the remote control 114 to turn on the power source 125 of the receiving apparatus 100 shown in FIG. 1B (step S111), in addition to the main power source 126, the power source 125 also starts to supply a power to function blocks. Then, connection is established with a previously designated portal site related to streaming contents, and information described in HTML, etc. in the site and metainformation related to streaming contents registered therein are received and stored in the metainformation memory 108 (steps S112 and S113).

The metainformation received here includes a location address, a title, a category (genre), an abstract, a reproduction time period, whether recording is permitted or not, and a producer name. If possible, a distribution schedule and the like are also obtained from the information contained in the portal site.

A series of metainformation related to contents which is stored in the metainformation memory 108 is decoded in the SI/metainformation decoder 110, and displayed as a contents guide screen on the display 113 (step S114).

As described above, in the receiving apparatus 100, the streaming contents guide function and the EPG function for digital broadcasts are integrated to display the "integrated contents guide" that enables the user to check the streaming contents and the television programs at a glance on one screen.

Naturally, as a simpler display method, an Internet browser application may be installed to receive data from several portal sites related to streaming contents which exist on the Internet and display the data as it is.

Here, if a user designates contents (step S115), metainformation of the selected contents is stored in the current metainformation memory 120 (step S116). As the current metainformation memory 120, a semiconductor memory such as a flash memory can be used. In addition, if a hard disk drive is provided for recording contents and programs, a partial area of the hard disk may be used for the current metainformation memory 120. Further, although not particularly shown in FIG. 1A, an external memory device connected to the receiving apparatus 100 through a network can serve as the current metainformation memory 120.

The Internet connector 105 starts to receive data from the address of the designated contents. The data is passed through the data buffer 106, the media decoder 109, and the display screen generator 112 to be outputted to the display 113 for displaying the streaming contents.

Further, in the case where a user audiovisually enjoys one set of contents for a predetermined time period of longer without interruption, the metainformation memory 108 stores the metainformation in the current metainformation memory 120.

After starting to thus receive the streaming contents, a state of the power is checked (step S117). In the case where a power on state continues here and a user switches the streaming contents, the metainformation related to the latest audiovisually enjoyed contents is stored in the current metainformation memory 120 for every switching. Therefore, in the case of a power off state, the metainformation of the previously audiovisually enjoyed contents is stored in the current metainformation memory 120.

Subsequently, the controller 121 detects the power off state of the power source 125 caused by the operation for turning off the power switch of the remote control 114 or the like operation, the controller 121 instructs the timer provided to the timer 117 to start the timer operation, and sets a period for outputting a timing signal during the power off state (step S118).

Simultaneously, the controller of Internet connection 116 reads the metainformation of the contents, which are previously audiovisually enjoyed immediately before the power off, from the current metainformation memory 120 (step S119), and sets the URL of the contents to the Internet connector 105 (step S120).

The Internet connector 105 accesses the URL of the contents that are previously audiovisually enjoyed immediately before the power off, and receives the streaming data from the site (step S121). The data buffer 106 stores the streaming data (step S122). Thus, the streaming contents are always buffered immediately after the power off.

Here, the power off state in this embodiment represents a state where the power source 125 of the receiving apparatus 100 is turned off by the remote control 114 as a generally expected state, assuming that the main power source 126 is kept in an on state. Naturally, while the power source 125 is in an off state, the timer function of the timer 117 may be operated and the timer may be used to appropriately supply a power only to a necessary function block other than the timer 117, for example, the streaming contents receiving function block 122 or the controller 121, which can be selected by setting in the controller (a power state manager) 121.

Further, while the power source 125 for the receiving apparatus 100 is in an off state, the timer 117 outputs the timing signal at the set period (step S123). The controller of Internet connection 116 controls the Internet connector 105 according to the timing signal, and periodically repeats in a background the operation for receiving the data of the streaming contents that are audiovisually enjoyed immediately before the power off and storing the data into the data buffer 106. Accordingly, the latest data is constantly accumulated in the data buffer 106. The above operations are normally performed because the main power source 126 is in an on state.

Subsequently, if the power source 125 is turned on by a user operation (step S124), the power is also supplied to the digital broadcast distribution receiving function block 123 and the another function block 124. Therefore, the controller 121 reads the data of the streaming contents accumulated in the data buffer 106 as described above, and decodes the data in the media decoder 109 (step S125). Then, the controller 121 controls the display screen generator 112 to generate a display screen of the streaming contents, and outputs the display screen to the display 113 (step S126). The controller 121 also instructs the controller of Internet connection 116 to establish connection to the address of the streaming contents. The controller of Internet connection 116 follows the instruction by controlling the Internet connector 105 to start to receive the streaming contents. After that, the streaming contents are consecutively reproduced and audiovisually enjoyed without interruption.

Note that in the case where the power source 125 is turned off when streaming contents are being audiovisually enjoyed, it may be determined by an apparatus specification which of the streaming contents, a television program, and a contents guide screen will be displayed at the start next time when the power is turned on. In this embodiment, in the case where the power is turned off when streaming contents are being audiovisually enjoyed, it is assumed that the streaming contents are displayed at the start. According to this embodiment, the audiovisual enjoying of the streaming contents can be started in the same manner as the case where a channel that is previously audiovisually enjoyed immediately before the power off is displayed at the start when the power of a general television set is turned on.

As described above, according to this embodiment, in the case where the power source 125 is turned off when streaming contents are being audiovisually enjoyed, the address of the streaming contents that are audiovisually enjoyed immediately before the power off is stored, the streaming contents are periodically received and accumulated during the power off state. Then, at the power on, the streaming contents data accumulated during the power off state are read and decoded to be displayed. Concurrently, the data restarts to be received from the address of the streaming contents that are received immediately before the power off. Accordingly, a user can automatically and promptly start to audiovisually enjoy the streaming contents that are audiovisually enjoyed immediately before the power off, without instructing another operation, such as selecting or receiving of the streaming contents, at the power on.

Embodiment 2

Next, description will be made of Embodiment 2. Note that, main blocks of a receiving apparatus according to this embodiment are the same as those shown in FIG. 1B.

Figure 5B:
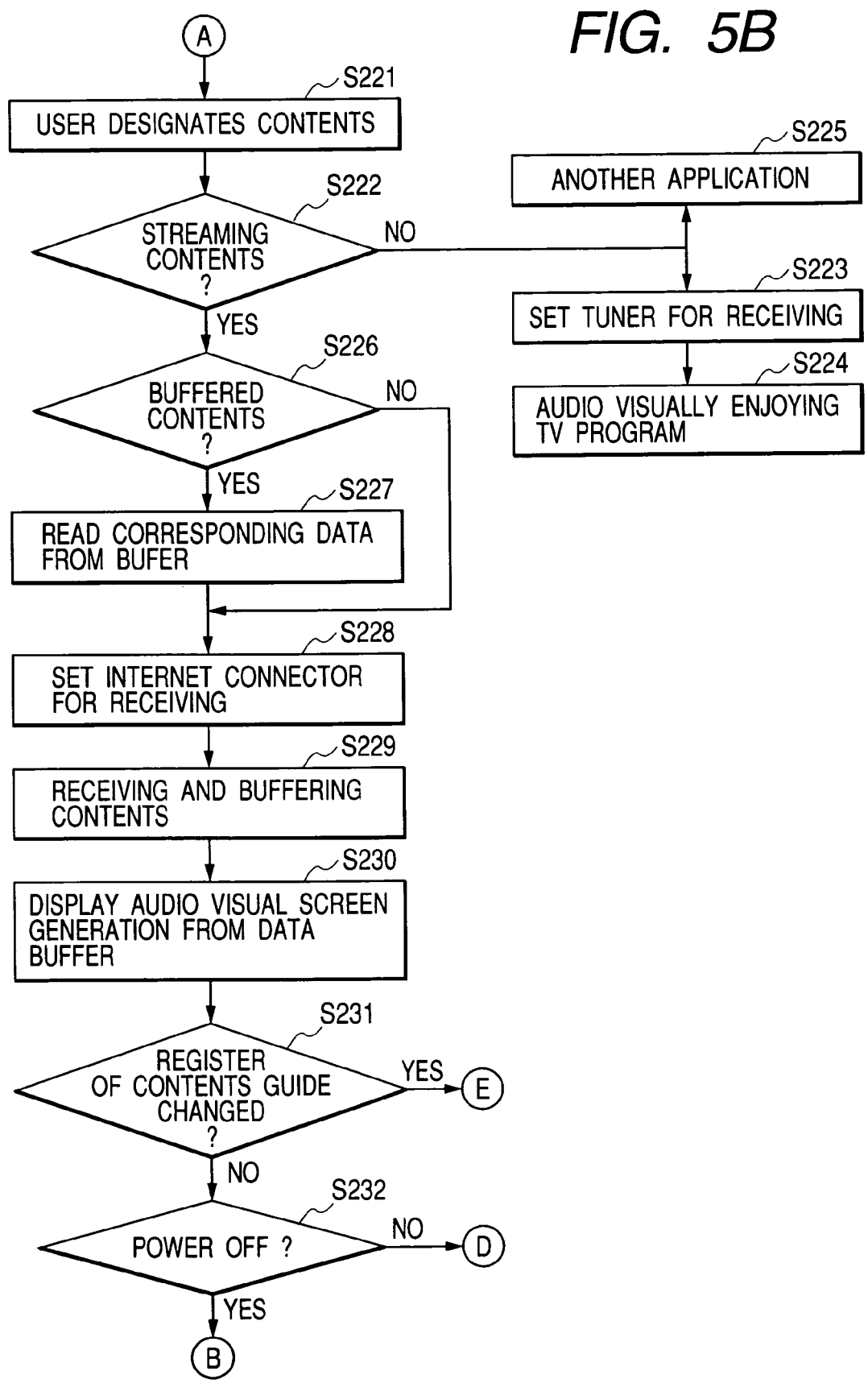
FIG. 5 is comprised of FIGS. 5A, 5B and 5C are flow charts showing a receiving operation.
Figure 5C:
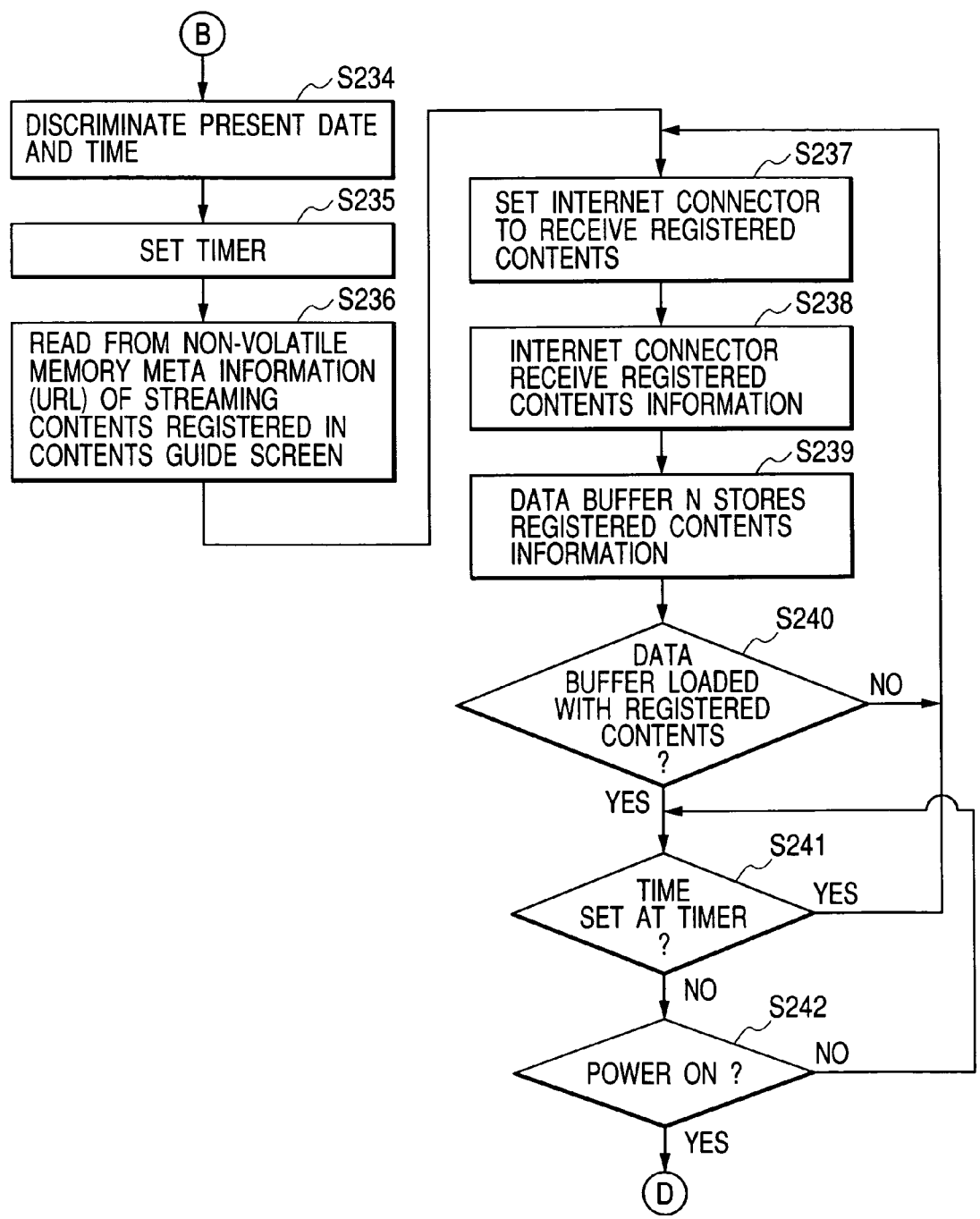

FIGS. 5A to 5C are flow charts showing a basic operation of the controller 121 according to this embodiment.

In FIGS. 5A to 5C, when the power is turned on (step S211), the Internet connector 105 connects to a portal site of streaming contents designated in advance, and receives metainformation related to the streaming contents registered in the portal site (step S212). The metainformation is stored in the metainformation memory 108 (step S213). This process is substantially the same as that of the above-mentioned embodiment. However, in this embodiment, this process is performed while a user is not audiovisually enjoying streaming contents.

Next, after checking a present time, the metainformation related to the streaming contents registered (displayed) at an integrated contents guide is stored in the current metainformation memory 120 (step S214).

Also in this embodiment, there is displayed an "integrated contents guide" shown in FIG. 2 which enables a user to check streaming contents and television programs on a single screen at a glance.

In FIG. 2, four sets of streaming contents are registered in a time slot of 19 hours that is a present time slot. A user is likely to select and audiovisually enjoy one from the four sets of the streaming contents as in the case of selecting a television program.

In this case, first, as to the four sets of streaming contents, metainformation related to the above streaming contents is extracted from the metainformation memory 108, and the extracted metainformation is written into the current metainformation memory 120. Further, information related to streaming contents that can be audiovisually enjoyed from a list in FIG. 2 (two programs listed in 20 hours, 21 hours, and 22 hours, respectively) is sequentially stored in the current metainformation memory 120 (step S215).

The controller of Internet connection 116 controls the Internet connector 105 according to the metainformation of the contents stored in the current metainformation memory 120 such that connection is established to an address of this streaming contents (step S216).

The Internet connector 105 accesses a URL of the designated contents and receives streaming contents data, which is then stored into the data buffer 106. (steps S217 and S218).

As described above, the number of the sets of streaming contents registered at the contents guide is not necessarily one. In the case where plural sets of contents are registered, according to an instruction from the controller of Internet connection 116, the Internet connector 105 can access URLs of plural contents preferences at the same time and receive the streaming contents data in parallel.

On the other hand, the number of sets of contents that can be accumulated in the data buffer 106 varies depending on a capacity of the data buffer 106. Unlike the broadcast system, there mixedly exist video and audio having various resolutions and distributing rates in the streaming contents. In general, contents with a higher resolution and a higher distribution rate require a larger buffer capacity.

For that reason, in this embodiment, an allocation capacity for the respect sets of contents is dynamically determined by checking distribution information such as a resolution and a recommended distribution rate of the respective contents from the metainformation of the target contents, and by checking a traffic (congestion) state of a communication channel of interest in the Internet connector 105 and calculating a substantial line speed.

At this time, a capacity is allocated, which is large enough to ensure that neither image deterioration nor interruption occurs and audiovisual enjoying can be smoothly started in the respective contents (step S219).

Note that, the data buffer 106 in this embodiment has a capacity sufficient enough to accumulate data for a predetermined time period of all data related to contents displayed on a list on the contents guide screen. Accordingly, when the user selects one from the plural sets of the streaming contents that are registered in a range that can be listed at the contents guide, the selected contents data is certainty stored in the buffer 106.

In this embodiment, the process from step S212 to step S219 is performed while the user is not audiovisually enjoying streaming contents (for example, the user is audiovisually enjoying a television program). In addition, the process may be performed immediately after the power of the receiving apparatus 100 is turned on, for example. In particular, the process performed immediately after turning the power on is necessary when the receiving apparatus 100 is actually in an initial condition. Whether or not this process is performed immediately after the power is turned on depends on specifications of receiving apparatuses. In the case of a receiving apparatus that performs a buffer operation while the apparatus power is in an off state, this process is not necessarily performed every time immediately after the power of the receiving apparatus is turned on. In contrast, in the case of a receiving apparatus that cannot perform the buffer operation while the apparatus power is in an off state, this process is necessarily performed immediately after the power is turned on.

Description will be again made of the operation flows of FIGS. 5A to 5C.

After the above process, the contents guide screen is displayed according to an instruction from the user (step S220). The user then performs a contents selection operation (step S221).

Here, in the case where the contents selected by the user are not streaming contents, for example, a case of a television program, the tuner 101 is controlled to receive a broadcast of a designated channel, and the selected program received and audiovisually enjoyed (steps S223 and S224). Further, in the case of another application, for example, a case of receiving and audiovisual enjoying data from an external device, or processing electronic mail or the like, a process is similarly performed correspondingly to the application (step S225).

On the other hand, in the case where the selected contents are streaming contents, it is judged whether or not the selected streaming contents are buffered in the data buffer 106 in advance (step S226). In the case of the buffered contents, the corresponding data is read from the buffer 106 (step S227). Then, the controller of Internet connection 116 performs connection setting on the Internet connector 105 to connect to an address of the streaming contents selected by the user and start to receive the selected contents from the server (steps S229 and S230). After that, the controller sequentially receives the streaming contents data and decodes the data read from the data buffer 106 to generate a display screen, and the display screen is displayed on the display 113 (step S228).

In this manner, when streaming contents displayed at the display guide are selected, a beginning part of this designated streaming contents is accumulated in the data buffer 106 in advance. Therefore, the user can start to audiovisually enjoy the contents dramatically more quickly as compared with the case where after the contents are designated, the Internet connector 105 connects to a corresponding site to receive the streaming data related to the designated contents.

In addition, there may be the case where the user selects and audiovisually enjoys streaming contents that are not registered in the contents guide. In such a case, an instruction is given to the Internet connector 105 as in the usual case to access a designated site. The user audiovisually enjoys while downloading the streaming contents from the designated site.

In this way, by receiving and accumulating in advance streaming contents registered at the contents guide while the streaming contents are not audiovisually enjoyed or immediately after the power is turned on, at the time of selecting streaming contents from the contents guide screen later, the user can audiovisually enjoy the streaming contents without delay in such a manner as to feel as comfortable as when switching channels on television.

After that, it is judged whether or not a change of registered contents exists at the contents guide, which is then reflected on the sequent buffering process (step S231). In a configuration adopted in this embodiment, the user can freely register or delete the streaming contents at the contents guide. When the change exists, the buffering process is performed again on the registered contents after the change.

Next, a background buffering operation while the power is in an off state is described.

According to this embodiment, a power off state means a state where the power of the receiving apparatus 100 is turned off using the remote control 114.

When an instruction of turning the power off is made through the remote control by the user (step S232), the controller 121 discriminates a present time (step S234), and sets a period for outputting a timing signal (step S235).

Next, a control is made such that the controller of Internet connection 116 reads metainformation related to streaming contents, which are registered in a range that can be listed at the contents guide with a present time as a starting point, from the current metainformation memory 120 (step S236), and outputs the metainformation to the Internet connector 105 (step S237).

The Internet connector 105 accesses a URL of the respective outputted contents, receives streaming data thereof, and stores the data in the data buffer 106 (steps S238 to S240).

Here, in the case where plural sets of target contents exist, as is described above, the Internet connector 105 accesses URLs of the plural contents preferences at the same time, and receives streaming data more efficiently.

Further, while the power is in an off state, according to timing signals from the timer 117, the Internet connector 105 repeats an operation for receiving streaming contents data periodically and storing the data in the data buffer 106 (step S241). With this configuration, it is possible to constantly accumulate the latest data of the streaming contents registered at the streaming contents guide in the data buffer 106 all the time.

Next, when the power is turned on by a user operation, the contents guide screen of FIG. 2, for example, is presented as an initial screen (step S242).

The user then selects contents. In the case where the user selects contents from the streaming contents registered at the contents guide, the data related to the selected contents is accumulated in the buffer 106 in advance. Thus, the user can start to audiovisually enjoy the streaming contents without delay.

As described above, according to this embodiment, by accumulating in advance streaming contents registered at the contents guide while the power is in an off state, after turning the power on, at the time of selecting streaming contents from the contents guide screen, the user can start to audiovisually enjoy the streaming contents without delay in such a manner as to feel as comfortable as when switching channels on television.

Embodiment 3

Next, description will be made of Embodiment 3. A receiving apparatus according to this embodiment has the same configuration as that shown in FIG. 1, except that the controller 121 has a function of managing operating states (activation, shutdown) of various applications incorporated in the receiving apparatus 100. The application here includes one referred to as "application" in a PC in general such as electronic mail and Internet browsing and also includes audiovisually enjoying of television programs, audiovisually enjoying of streaming contents, and audiovisually enjoying of contents inputted from an external audiovisual device as well.

Figure 6:
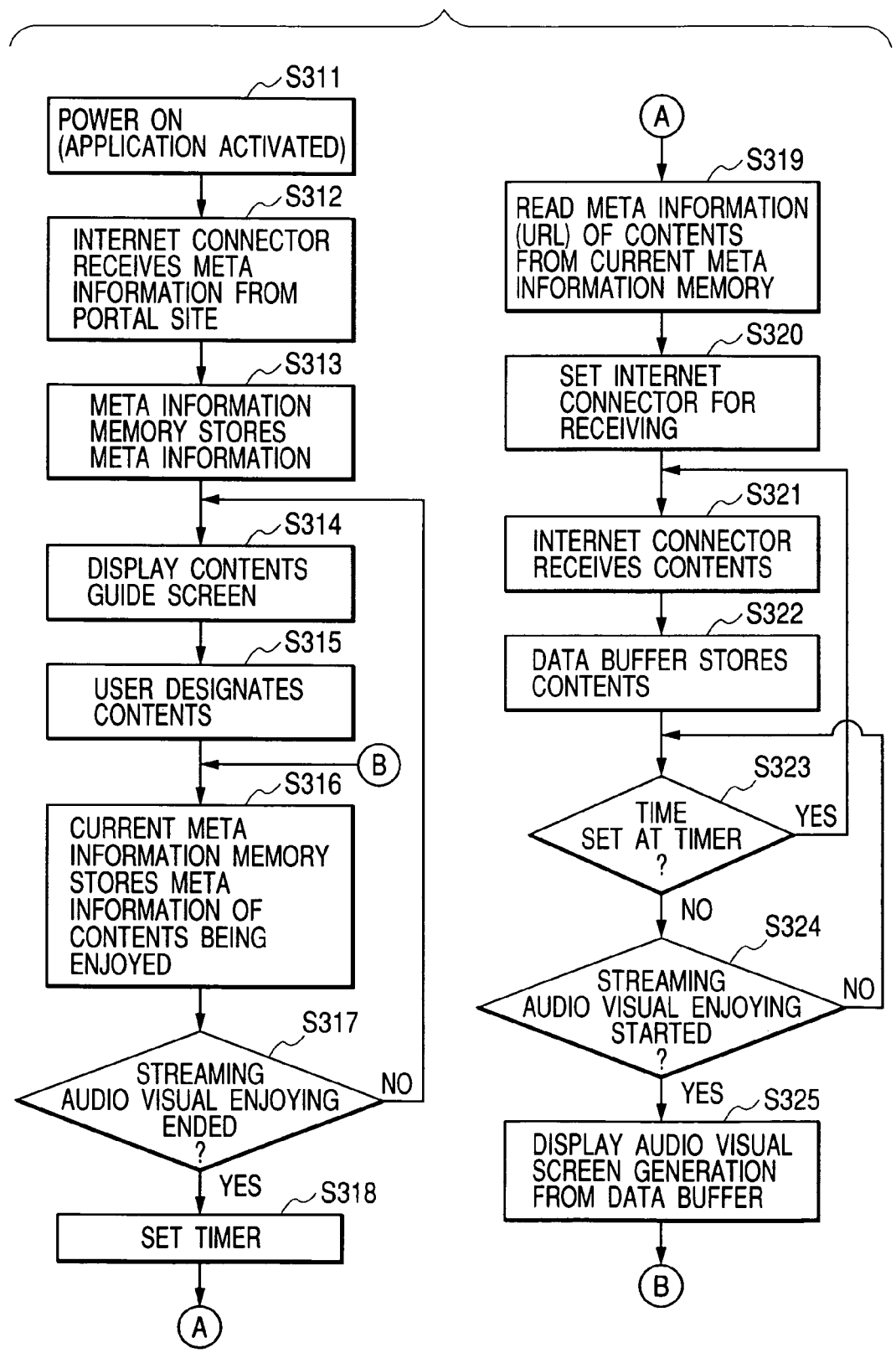
FIG. 6 is a flow chart showing a receiving operation.

FIG. 6 is a flow chart showing an operation of the controller 121 when the streaming contents audiovisual enjoying is switched to the television program audiovisual enjoying, according to this embodiment.

In FIG. 6, a process from step S311 to step S316 is a process in which metainformation of the latest streaming contents selected by the user is stored in the current metainformation memory 120 after the power is turned on. The process is the same as that from step S111 to step S116 of FIG. 4.

Next, in step S317, it is judged whether or not the contents to be audiovisually enjoyed is switched from the streaming contents to another application such as a television program.

Here, when it is judged that the switching is made to another application such as a television program, an instruction is issued such that the timer 117 starts timekeeping, and a period is set for a outputting a timing signal (step S318). While another application is activated, a URL of the streaming contents audiovisually enjoyed periodically immediately before the switching is read from the current metainformation memory 120, and the streaming contents are received, and accumulated in the buffer 106 (steps S319 to S323). Also in this embodiment, those processes are performed in the background so that audiovisual enjoying of the television program by the user is not disturbed.

After that, in the case of selecting the streaming contents again by a remote control, it is judged that the streaming audiovisual enjoying is started (step S324), the data of the streaming contents audiovisually enjoyed immediately before the switching is read from the data buffer 106 to send the data to the media decoder 109, and the display is then started. In addition, the streaming contents data starts to be received, and thereafter the user audiovisually enjoys the streaming contents while the data is sequentially accumulated in the data buffer 106.

In this manner, in this embodiment, when an instruction to switch to another application is given during audiovisual enjoying of the streaming contents, streaming contents data immediately before the switching is periodically received and the data is accumulated in the data buffer 106 during audiovisual enjoying of the another application. Then, in the case where the instruction to switch to the streaming contents is given again, the accumulated streaming contents data is read to be displayed.

For that reason, it is possible that the streaming contents and the general television program are switched over to one another quickly, for example. The user does not feel stress and can switch the audiovisual enjoying contents in such a manner as in zapping.

Embodiment 4

Figure 3:
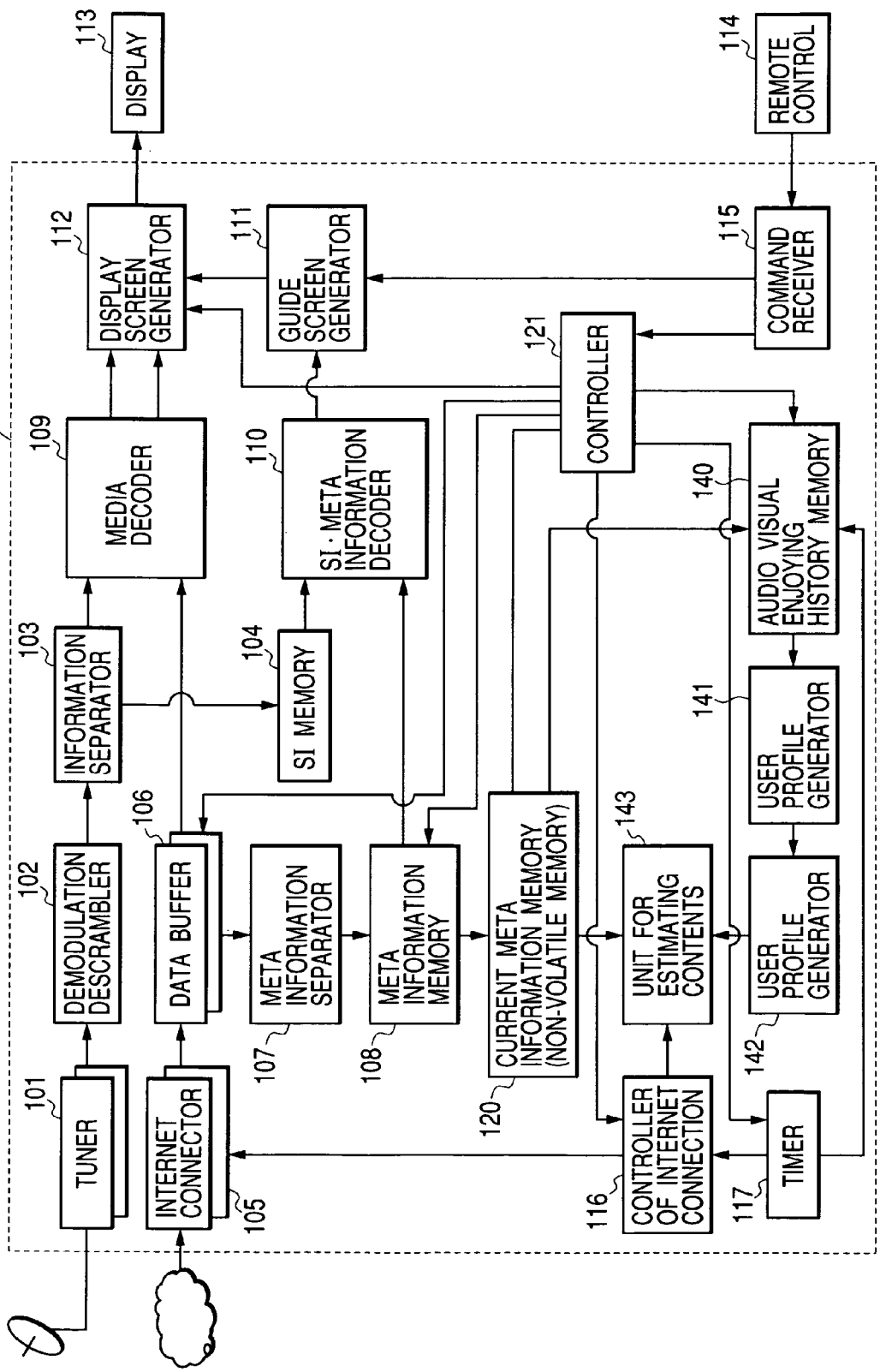
FIG. 3 is a block diagram showing another configuration of a receiving apparatus to which the present invention is applied.

FIG. 3 is a diagram showing main blocks of a receiving apparatus 300 according to this embodiment. The receiving apparatus 300 shown in FIG. 3 has substantially the same function as that of the receiving apparatus 100 shown in FIG. 1A. Also, blocks of FIG. 3 having the same function as those of FIGS. 1A and 1B are denoted by the same reference numerals.

Hereinbelow, functions of blocks added to or replaced in FIGS. 1A and 1B are described.

In FIG. 3, the controller 121 recognizes a command received by the command receiver 115 from the remote control 114. Based on the content of the command, the controller 121 determines which streaming contents and television programs a user audiovisually enjoyed, and sends the history to an audiovisual enjoying history memory 140.

In addition to the above-mentioned function, the timer 117 provides the audiovisual enjoying history memory 140 with a date, a day of the week, and a time at which the user audiovisually enjoyed the streaming contents and the television programs. Note that, in this embodiment, the audiovisual enjoying history memory 140 is controlled to record the history therein only when the user audiovisually enjoys streaming contents and a television program continuously for a predetermined period of time.

The audiovisual enjoying history memory 140 stores a history as to which contents in which site the user audiovisually enjoys. Parameters to be stored include a URL, a title, and a genre of contents, a date, a day of the week, and a time when the user audiovisually enjoyed the contents, and the like.

A user profile generator 141 performs a calculation process based on a predetermined algorithm using data inputted from the audiovisual enjoying history memory 140 to generate a user profile that is pattern data concerning contents audiovisual enjoying of the user, and stores the profile in a user profile memory 142.

Note that, this user profile concerning contents audiovisual enjoying is main individual profile data for respective users who use the receiving apparatus 300. In the case where the receiving apparatus is used in an ordinary household, profiles for respective family members (father, mother, and child) are independently accumulated and managed. In this regard, in some cases, those profiles for respective members may be accumulated collectively, not independently, as a single profile for the family.

A unit for estimating contents 143 estimates and determines a contents preference that may be selected by the user from among contents that are stored in the current metainformation memory 120 and can be audiovisually enjoyed from a present time or in a few hours, based on the predetermined algorithm and the user profile data concerning contents audiovisual enjoying stored in the user profile memory 142.

The controller of Internet connection 116 performs connection setting on the Internet connector 105 to access a URL of streaming contents corresponding to an instruction from the unit for estimating contents 143 in accordance with a timing signal from the timer 117.

Next, operations according to this embodiment will be described.

Figure 7B:
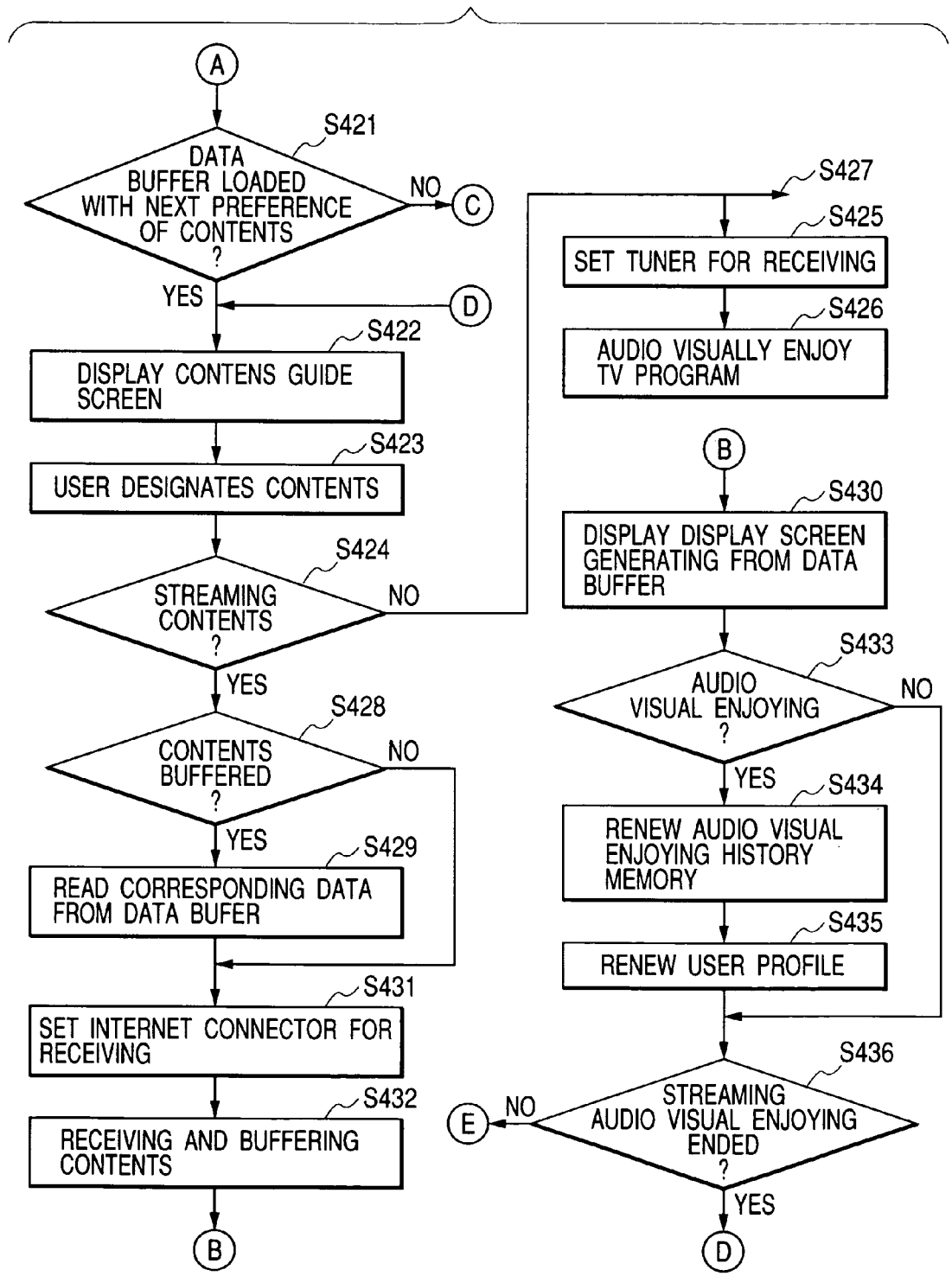
FIG. 7 is comprised of FIGS. 7A and 7B are flow charts showing a receiving operation.

FIG. 7 is a flow chart showing an operation of the controller 121 when receiving streaming contents in this embodiment.

In FIG. 7, when the power of the receiving apparatus 300 is turned on, the Internet connector 105 connects to a portal site of streaming contents designated in advance, receives metainformation related to the streaming contents registered in the portal site, and stores the metainformation in the metainformation memory 108 (steps S411 to S413). This process is the same as in the above-mentioned embodiments.

Next, metainformation related to streaming contents that can be audiovisually enjoyed at a present moment or in a few hours is extracted from the metainformation memory 108 and stored in the current metainformation memory 120 (step S414).

Next, after the timer 117 discriminates a present date and time, and a day of the week (step S415), the unit for estimating contents 143 estimates and determines a contents preference that may be selected by the user for streaming audiovisual enjoying next time by referring to the user profile data concerning contents audiovisual enjoying and the data stored in the current metainformation memory 120 (steps S416 and S417).

Here, in the case where identical site addresses of contents exist in histories of the past contents audiovisual enjoying with reference to the same time on the same day of the week, it is easy to estimate and determines the audiovisual enjoying contents preference based on the above information. When there are no contents having identical addresses to each other, the unit for estimating contents 143 estimates and determines a preference from profile information of contents themselves, such as a title, a category, and a producer of the contents, irrespective of addresses and distribution information such as a day of the week and a time.

When the next contents preference is determined, an address of the contents preference is sent to the controller of Internet connection 116, and the address of the above next contents preference is set in the Internet connector 105 (step S418). The Internet connector 105 accesses the address of the above next contents preference to receive streaming data and stores the data in the data buffer 106 (steps S419 and S420).

Here, the number of the contents preferences outputted from the unit for estimating contents 143 is not necessarily one. In many cases, several to ten and several contents preferences are outputted therefrom. For that reason, in this embodiment, the number of the next preferences to be buffered is also not only one, but plural contents preferences (second preference, third preference) are buffered. In such a case, the Internet connector 105 accesses URLs of the plural contents preferences at the same time and receives the streaming contents data in parallel according to an instruction from the controller of Internet connection 116.

In addition, a managing mode of the data buffer 106 when receiving and buffering plural sets of contents (capacity allocation to the respective sets of contents) is the same as that of Embodiment 2. That is, a capacity is allocated, which is large enough to ensure that audiovisual enjoying can be smoothly started in the respective contents.

In this way, the operation for receiving and buffering the next contents preference is repeated until the data buffer 106 installed in the receiving apparatus 300 is loaded with the next contents preference data (step S421). Basically, in a state where the data buffer is loaded with the next contents preference data, the receiving apparatus waits for a user to select contents.

Based on the same concept as in Embodiment 2, those processes are performed in a time slot in which the user is not audiovisually enjoying streaming contents (for example, the user audiovisually enjoys a television program) or immediately after the power of the receiving apparatus 300 is turned on.

After that, the contents guide screen is displayed by an instruction from the user (step S422), and the user performs an operation for selecting contents (step S423).

Similarly to Embodiment 2, in the case where the contents selected by the user are not streaming contents at this time, for example, in the case of a television program, the tuner 101 is controlled such that the user audiovisually enjoys a predetermined program, and the user receives and audiovisually enjoys the selected program (steps S425 and S426). Further, in the case of another application, for example, a case of audiovisually enjoying of an image from an external audiovisual device, or electronic mail, a process is similarly performed correspondingly to the application (step S427).

On the other hand, in the case where the selected contents are streaming contents, it is judged whether or not the selected streaming contents are previously estimated as the next contents preference and buffered in the data buffer 106 (step S428). When it is judged that the contents are buffered in advance, the corresponding data of the accumulated streaming contents is read from the buffer 106 to be sent to the decoder 109 (step S429). Then, the controller of Internet connection 116 performs connection setting on the Internet connector 105 to connect to an address of the streaming contents selected by the user, and starts to receive the selected contents from the server, and thereafter the user audiovisually enjoys the selected streaming contents continuously while renewing the data buffer 106 sequentially (steps S431 and S432).

In this manner, by buffering data of a streaming contents preference in advance that may be selected by the user, when the user selects the corresponding contents, it is possible to start audiovisual enjoying of the contents without delay. Therefore, the contents can be displayed dramatically more quickly as compared with the case where after the contents are designated, the Internet connector 105 connects to a corresponding address to receive the streaming data related to the designated contents.

On the other hand, in the case where the contents selected by the user do not exist in the streaming contents that are accumulated as the next contents preferences, an instruction is given to the Internet connector 105 as in the usual case to access a designated site. The Internet connector 105 receives the streaming contents from the designated site.

Regardless of matching or mismatching of the selected streaming contents with the next contents preference, after the streaming contents is selected, when it is judged with the timer 117 that the user audiovisually enjoys the selected streaming contents continuously for a given length of time (step S433), the result is stored in the audiovisual enjoying history memory 140 (step S434). After that, as appropriate, the user profile is renewed (step S435). Note that, this profile renewal may be performed as needed if the CPU throughput of the apparatus can afford. If the throughput has no room, the renewal may be performed every given period of time or performed in a time slot in which audiovisual enjoying is not usually performed by the user such as a late evening slot.

After the renewal of the profile, if necessary, a new contents preference is estimated based on the renewed user profile, data of this new contents preference is received, and accumulated in the data buffer 106. Depending on the CPU throughput, the operation is performed such that a new contents preference is estimated every time the user profile is renewed in order to prepare for the next audiovisual enjoying.

FIG. 8 shows an example of the user profile data used in this embodiment. In FIG. 8, "cnt_URL" represents a location address and file name (URL) of the contents audiovisually enjoyed by the user. "CRID" represents a reference ID of the contents concerned. A contents reference ID is an ID for specifying the main contents data, independent of the URL for specifying the contents location. The contents reference ID is written in a format showing a producer name and a classification name (category and series title of the contents) that is managed to assure uniqueness of the contents for each producer. Note that, in FIG. 8, a notation "AAA/Sport" represents streaming contents in a management category of sports related to a producer or contents distribution manager called "AAA".

"Cat_ID" represents a category of the contents concerned. Specifically, examples of the category includes news, sports, drama, and education. In the case of streaming contents, at present, an original categorization is made for the respective contents producers and contents distribution managers.

Note that, standardization of MPEG-7 and TV-Anytime has been progressed in standard-setting organizations such as Moving Picture Experts Group and TV-Anytime Forum in order to set a scheme with which contents employing televisions, the Internet, package media, etc., as media, are uniquely specified irrespective of types of the media. When metainformation and a contents localization method are standardized in the future by the activities of the organizations, it becomes possible to utilize the metainformation based on the resultant standard.

"Date", "Day", and "Time" represent date, a day of the week, and a time, respectively, at which the user audiovisually enjoys the contents. These information are inputted by the timer 117 of the receiving apparatus 300.

"Rec" represents whether or not the user records the contents by recording means (not shown). For the estimation of the next contents preference in this embodiment, this recording history is used and treated as the audiovisual enjoying history.

Note that, although a function block as the recording means is not shown in FIG. 3, an external recording apparatus to be connected to the receiving apparatus 300 via an interface is assumed as the recording means. The recording history is accumulated through an instruction by the user with a remote control operation using the above-mentioned streaming contents guide screen or the like.

"Date_Stamp" represents the latest day on which an event (contents audiovisual enjoying) concerned occurs. Similar to "Date", "Day", and "Time", "Date_Stamp" is inputted by the timer 117 the receiving apparatus 300. "Freq" represents a frequency of occurrence of the event.

In addition, a notation "−1" shown in FIG. 8 means "Don't care", in other words, "irrespective of this parameter value".

For example, in FIG. 8, the top line indicates that: irrespective of the date (−1 notation), on Saturday (Day=6), at 7 p.m. (Time=19), there are in the past 10 audiovisual enjoying histories (Freq=10) of streaming contents called "Filename1" in a contents distribution site (ServerA) called "AAA". At the same time, it is understood that the category of the contents is sports (Cat_ID=2), and the latest audiovisual enjoying is made on 28 of Apr., 2001.

Note that, although specific description of category ID is omitted here, several examples are shown in FIG. 8. A certain number (ID) is allocated for the respective categories in the apparatus. The category information obtained from the contents metainformation is recorded in the profile in the form of number by using a predetermined comparison table or the like.

The fifth line from the top of FIG. 8 indicates that: irrespective of a day of the week and a date (Date and Day=−1), at 7 a.m. (Time=07), there are in the past 20 audiovisual enjoying histories of streaming contents "Filename24" in a contents distribution site "GGG".

The next contents preference is determined by referring to such a user profile as shown in FIG. 8 and performing a calculation process based on a predetermined algorithm. As an example, the order of next contents preferences is change under a predetermined condition, and filtering is then performed. At a certain timing of contents inference, when a condition that completely matches with one in the profile does not exist, several parameters are set to "Don't care", so that more generally matching contents is found and set as the next contents preference.

More specifically, by putting weight on parameters of the category of the contents themselves or the like rather than parameters of audiovisual enjoying histories, contents in a genre that the user may prefer are selected as the next contents preference from the group of contents that can be audiovisually enjoyed, if such contents exist.

Note that, the user profile shown in FIG. 8 is a history data having a unit of 1 hour as a time parameter for simplification of description. However, in reality, a history is left with a much higher frequency. In this embodiment, every time the user profile is renewed, the operation for estimating the next contents preference is performed.

Further, it is possible to generate a user profile in which not only audiovisual enjoying histories but also television program audiovisual enjoying histories are taken into consideration. In such a case, information on genre and titles in particular among information concerning television programs can be treated as parameters commonly used with metainformation of streaming contents. Therefore, it is possible to understand which kind of contents the user prefers more accurately from a large number of viewpoints. With this configuration, there is an effect that the inference of the next contents preference becomes more accurate.

Further, in order to increase a relevance ratio of the next contents preference to be buffered, a sufficient amount of audiovisual enjoying histories are necessary. Therefore, in an early stage of the apparatus use, initial data of the user profile may be generated as follows. A screen is presented to the user to inquire his/her interest and favorites, and from the screen the user selects or inputs a favorite genre and other given items.

Further, in the apparatus shown in FIG. 3, a series of operations, in which audiovisual enjoying contents are estimated based on the user profile, and buffering is performed in advance as described above, can be carried out while the power is in an off state. The fundamental operation flow in this case is basically the same as that of the background buffering flow during the power off state (steps S232 to S242 of FIGS. 5B and 5C). Only the difference is that the contents to be buffered are streaming contents registered at the contents guide in Embodiment 2, but are streaming contents inferred based on the user profile in this embodiment.

As described above, while the user is not audiovisually enjoying the streaming contents or the power is in an off state, based on the user profile generated from the audiovisual enjoying histories, contents that the user may audiovisually enjoy are estimated, and a part of the streaming contents data is buffered. As a result, the waiting time period, which is required in the conventional audiovisual enjoying is eliminated at the time of starting audiovisual enjoying or switching contents. Accordingly it is possible to select and audiovisually enjoy the contents smoothly.

As has been described above, according to the present invention, the streaming contents, which are received immediately before the power is turned off, are periodically received and accumulated during the power off state. Accordingly, next time when the power is turned on, the streaming contents, which are audiovisually enjoyed immediately before the power off, can automatically and promptly start to be audiovisually enjoyed.

Further, according to the present invention, during the monitor stop for the streaming contents, the streaming contents are periodically received and accumulated. Accordingly, at the monitor restart for the streaming contents, the monitoring of the streaming contents can be promptly restarted.

Further, according to the present invention, the plural sets of the streaming contents are periodically received and accumulated based on the guide information. Accordingly, when a user select the streaming contents based on the guide information, the streaming contents can immediately start to be audiovisually enjoyed.

Further, according to the present invention, the streaming contents preferences estimated based on the user profile are periodically received and accumulated when the streaming contents are not audiovisually enjoyed, immediately after the power is turned on, or during the power off state. Accordingly, when the user select the streaming contents, the streaming contents can immediately start to be audiovisually enjoyed.

What is claimed is:

1. A receiving apparatus for receiving a moving image-streaming content through an internet, the moving image-streaming content being internet broadcasting content, said apparatus comprising:

a receiving unit for receiving a moving image-streaming content which is internet broadcasting content by an access through the internet to a URL of the streaming content;

a memory unit for storing URL information of the moving image-streaming content received by the receiving unit;

a display unit for displaying on a display screen the moving image-streaming content received by the receiving unit;

an operation unit for receiving an operation of turning off and turning on a power source for supplying power;

a buffering unit for buffering the moving image-streaming content received by the receiving unit; and a control unit for (1) controlling, responsive to the receiving by the operation unit of the operation of turning off the power source, to read out the URL information stored in the memory unit, and (2) controlling, while the power source is in an off state, to periodically repeat accessing of a URL of the moving image-streaming content which had been displayed before the turning off the power source, so as to receive by the receiving unit and to buffer in the buffering unit the latest moving image-streaming content, and (3) controlling, responsive to the receiving by the operation unit of the operation of turning on the power source, to read out from the buffering unit the latest buffered moving image-streaming content and to start the displaying on the display screen of the latest buffered moving image-streaming content.

2. A receiving apparatus for receiving a moving image streaming content through an internet, the moving image streaming content being internet broadcasting content, said apparatus comprising:

a first receiving unit for receiving a moving image-streaming content which is internet broadcasting content by an access through an internet to a URL of the moving image-streaming content;

a memory unit for storing URL information of the moving image-streaming content received by the first receiving unit;

a second receiving unit for receiving a television broadcast program transmitted through a broadcast signal;

an operation unit for receiving an operation of switching from a displaying of the moving image-streaming content on a display screen to a displaying of the television broadcast program on the display screen, and an operation of switching from the displaying of the television broadcast program on the display screen to the displaying of the moving image-streaming content on the display screen;

a buffering unit for buffering the moving image-streaming content received by the first receiving unit; and a control unit for (1) controlling, responsive to the receiving by the operation unit of the operation of switching from the displaying of the moving image-streaming content on the display screen to the displaying of the television broadcast program on the display screen, (a) to stop the displaying of the moving image-streaming content on the display screen and to start the displaying of the television broadcast program on the display screen, (b) to read out the URL information stored in the memory unit, (2) controlling, while the television broadcast program is displayed on the display screen, to periodically repeat accessing of a URL of the moving image-streaming content which had been displayed before starting the displaying of the television broadcast program on the display screen, so as to receive by the receiving unit and to buffer in the buffering unit the latest moving image-streaming content, and (3) controlling, responsive to the receiving by the operation unit of the operation of switching from the displaying of the television broadcast program on the display screen to the displaying of the moving image-streaming content on the display screen, to read out from the buffering unit the latest buffered moving image-streaming content and to start the displaying on the display screen of the latest buffered moving image-streaming content.

3. The receiving apparatus according to claim 1, wherein the control unit is further configured to, responsive to the receiving by the operation unit of the operation of turning on the power source, (a) read out the URL information stored in the memory unit, (b) receive by the receiving unit the latest moving image-streaming content by accessing the URL of the moving image-streaming content which had been displayed before the turning off the power source, and (c) change the content displayed on the display screen from the latest moving image-streaming content, which had been buffered in the buffering unit while the power source had been in an off state, to the moving image-streaming content being received by the receiving unit.

4. The receiving apparatus according to claim 2, wherein the control unit is further configured to, responsive to the receiving by the operation unit of the operation of switching from the displaying of the television broadcast program on the display screen to the displaying of the moving image-streaming content on the display screen, (a) read out the URL information stored in the memory unit, (b) receive by the receiving unit the latest moving image-streaming content by accessing the URL of the moving image-streaming content which had been displayed before stopping of the displaying on the display screen, and (c) change the content displayed on the display screen from the latest moving image-streaming content, which had been buffered in the buffering unit while the television broadcast program had been displayed on the display screen, to the moving image-streaming content being received by the receiving unit.

5. A method for receiving a moving image-streaming content through an internet, the moving image-streaming content being internet broadcasting content, the method comprising:

receiving a moving image-streaming content which is internet broadcasting content by an access through the internet to a URL of the streaming content;

storing URL information of the moving image-streaming content;

displaying the moving image-streaming content on a display screen;

receiving an operation of turning off and turning on a power source for supplying power;

buffering the moving image-streaming content;

after receiving of the operation of turning off the power source and before receiving of the operation of turning on the power source, reading out the URL information and periodically repeating accessing of a URL of the moving image-streaming content which had been displayed before the turning off the power source, so as to receive and buffer the latest moving image-streaming content; and responsive to the receiving of the operation of turning on the power source, reading out the latest buffered moving image-streaming content and starting the displaying on the display screen of the latest buffered moving image-streaming content.

6. The method according to claim 5, further comprising:

responsive to the receiving of the operation of turning on the power source, (a) reading out the URL information, (b) receiving the latest moving image-streaming content by accessing the URL of the moving image-streaming content which had been displayed before the turning off the power source, and (c) changing the content displayed on the display screen from the latest moving image-streaming content, which had been buffered in the buffering unit when the power source had been in an off state, to the moving image-streaming content being received by the receiving.

7. A method for receiving a moving image-streaming content through an internet, the moving image-streaming content being internet broadcasting content, the method comprising:

receiving a moving image-streaming content which is internet broadcasting content, by an access through an internet to a URL of the moving image-streaming content;

storing URL information of the received moving image-streaming content;

receiving a television broadcast program transmitted through a broadcast signal;

receiving an operation of switching from a displaying of the moving image-streaming content on a display screen to a displaying of the television broadcast program on the display screen, and an operation of switching from the displaying of the television broadcast program on the display screen to the displaying of the moving image-streaming content on the display screen;

buffering the moving image-streaming content;

(1) responsive to the receiving of the operation of switching from the displaying of the moving image-streaming content on the display screen to the displaying of the television broadcast program on the display screen, (a) stopping the displaying of the moving image-streaming content on the display screen and starting the displaying of the television broadcast program on the display screen, and (b) reading out the URL information;

(2) while the television broadcast program is displayed on the display screen, periodically repeating accessing of a URL of the moving image-streaming content which had been displayed before starting the displaying of the television broadcast program on the display screen, so as to receive and buffer the latest moving image-streaming content; and (3) responsive to the receiving of the operation of switching from the displaying of the television broadcast program on the display screen to the displaying of the moving image-streaming content on the display screen again, reading out the latest buffered moving image-streaming content and starting the displaying on the display screen of the latest buffered moving image-streaming content.

8. The method according to claim 7, further comprising:

responsive to the receiving of the operation of switching from the displaying of the television broadcast program on the display screen to the displaying of the moving image-streaming content on the display screen, (a) reading out the URL information, (b) receiving the latest moving image-streaming content by accessing the URL of the moving image-streaming content which had been displayed before stopping of the displaying on the display screen, and (c) changing the content displayed on the display screen from the latest moving image-streaming content, which had been buffered while the television broadcast program had been displayed on the display screen, to the moving image-streaming content being received.

* * * * *